(12) United States Patent
Kozko et al.

(10) Patent No.: US 9,448,389 B1
(45) Date of Patent: Sep. 20, 2016

(54) OPTICAL DEVICE HAVING PRISM-SHAPED REFLECTOR DIRECTING OPPOSING LIGHT PATHS ONTO AN IMAGE SENSOR

(71) Applicant: IC REAL TECH, INC., Pompano Beach, FL (US)

(72) Inventors: Dmitry Kozko, Aventura, FL (US); Ivan Onuchin, Hollywood, FL (US)

(73) Assignee: IC REAL TECH, INC., Pompano Beach, FL (US)

( * ) Notice: Subject to any disclaimer, the term of this patent is extended or adjusted under 35 U.S.C. 154(b) by 0 days.

(21) Appl. No.: 14/983,832

(22) Filed: Dec. 30, 2015

(51) Int. Cl.
  G02B 13/06 (2006.01)
  G02B 7/02 (2006.01)
  G02B 7/18 (2006.01)
  G02B 5/00 (2006.01)
  G02B 17/04 (2006.01)

(52) U.S. Cl.
  CPC .............. G02B 13/06 (2013.01); G02B 5/003 (2013.01); G02B 7/1805 (2013.01); G02B 17/04 (2013.01)

(58) Field of Classification Search
  CPC ........ G02B 13/06; G02B 7/02; G02B 7/182; G02B 17/0856; G02B 7/021; H04N 13/0214; H04N 13/0217

USPC .......... 359/618, 726, 733–736; 348/49, 335, 348/340
See application file for complete search history.

(56) References Cited

U.S. PATENT DOCUMENTS

| | | | | |
|---|---|---|---|---|
| 5,835,133 A | * | 11/1998 | Moreton et al. ... | G02B 27/2264 348/49 |
| 2013/0057732 A1 | * | 3/2013 | Uemura ............ | H04N 13/0217 348/240.3 |

* cited by examiner

*Primary Examiner* — Darryl J Collins
(74) *Attorney, Agent, or Firm* — Patents on Demand P.A.; Brian K. Buchheit; Scott M. Garrett (57) ABSTRACT

A camera can include a housing, two lenses, a prism-shaped reflector, a reflector support surface, and an optical sensor. The two lenses are coupled to the housing in substantially opposing directions. The prism-shaped reflector has two parallel surfaces and three additional surfaces comprising: a first and a second reflective surfaces and a support plane. The reflector support surface is bonded to the prism-shaped reflector at the support plane. The optical sensor includes a surface upon which two non-overlapping image circles are concurrently projected; one from each of the two lenses. Each image circle results from a light path from a respective one of the two lenses being reflected off one of the first and second reflective surfaces onto the surface of the optical sensor.

20 Claims, 6 Drawing Sheets

OPTICAL DEVICE HAVING PRISM-SHAPED REFLECTOR DIRECTING OPPOSING LIGHT PATHS ONTO AN IMAGE SENSOR

BACKGROUND

The present invention relates to the field of multi-lens optical devices and, more particularly, to optical devices having a triangular prism-shaped reflector directing opposing light paths onto an image sensor surface.

Optical devices are gaining in popularity. For example, smartphones are almost universally equipped with a front and rear facing camera able to capture quality images. Panoramic video devices and devices able to concurrently take video images of a field-of-view greater than one hundred and eighty degrees are becoming increasingly popular. For example, one-shot cameras and camera extensions that permit a three hundred and sixty degree field of view have seen significant commercial success.

Manufacturing costs can be an impediment to the otherwise strong proliferation of optical devices. Increasingly, consumers demand high-quality and high fidelity video/images at modest costs. The precision optics required to achieve optical resolutions desired for these devices are a significant factor leading to success or failure in the marketplace.

BRIEF SUMMARY

One aspect of the present invention includes an optical device with a housing, two lenses, a triangular prism-shaped reflector, a reflector support surface, a support gap, and one or more optical sensors. The two lenses are coupled to the housing in substantially opposing directions. The triangular prism-shaped reflector has two parallel surfaces and three additional surfaces including: a first and a second reflective surfaces and a support plane. The reflector support surface is bonded to the triangular prism-shaped reflector at the support plane. The support gap is a volumetric support void between the triangular shaped prism and interior components excluding the reflector support surface as well as an interior surface of the housing. Ninety five percent or more support for maintaining a relative position of the triangular prism-shaped reflector to other components of the optical device results from the reflector support surface being bonded to the triangular prism-shaped reflector. One or more optical sensors include a surface upon which two non-overlapping image circles are concurrently projected; one from each of the two lenses. Each image circle results from a light path from a respective one of the two lenses being reflected off one of the first and second reflective surfaces onto a surface of the one or more optical sensors.

Another aspect of the present invention can include a camera with a housing, two lenses, a prism-shaped reflector, a reflector support surface, and an optical sensor. The two lenses are coupled to the housing in substantially opposing directions. The prism-shaped reflector has two parallel surfaces and three additional surfaces including: a first and a second reflective surfaces and a support plane. The reflector support surface is bonded to the prism-shaped reflector at the support plane. The optical sensor includes a surface upon which two non-overlapping image circles are concurrently projected; one from each of the two lenses. Each image circle results from a light path from a respective one of the two lenses being reflected off one of the first and second reflective surfaces onto the surface of the optical sensor.

Yet another aspect of the present invention can include a camera with a housing, two lenses, a prism-shaped reflector, a reflector support surface, and an optical sensor. The two lenses are coupled to the housing in substantially opposing directions. The prism-shaped reflector has a first reflection region on a first reflection plane, a second reflection region on a second reflection plane, and a support region on a support plane. The first reflection region, the second reflection region, and the support region are planar surfaces. An angle of eight five to ninety five degrees exists between the first reflection region and the second reflection region. An angle of forty to fifty degrees exists between the support region and each of the first and second reflection regions. The reflector support surface is bonded to the prism-shaped reflector at the support region. The optical sensor includes a surface upon which two non-overlapping image circles are concurrently projected; one from each of the two lenses. Each image circle results from a light path from a respective one of the two lenses being reflected off one of the first and second reflection regions onto a surface of the optical sensor.

DETAILED DESCRIPTION

Embodiments of the present invention establish two lenses that are substantially opposing when fixed in a housing. A triangular prism-shaped reflector (with two reflection planes) redirects the light from the opposing lenses onto one or more image sensor(s). The prism-shaped reflector is a unary component with two reflective surfaces for redirecting the light. A third surface (excluding the prism's bases) attaches to a plane of a support structure. This third, support structure is placed with precision into a housing of the optical device so that the prism-shaped reflector is positioned to reflect the light path from the lenses onto the image sensor(s). Conventional methodologies generally would create a void or concavity that is the inverse of the shape of the triangular prism-shaped reflector. These methodologies are problematic, as abnormalities (protrusions/indentations from a desired baseline expected within a tolerance range during manufacturing) in the prism-shaped reflector and/or in the concavity will result in an imprecision that degrades fidelity of the optical device or that even renders it unusable due to significant optical misalignments. Precisely mounting the triangular prism-shaped reflector to a planar support surface is easy to accomplish using standard manufacturing techniques. Similarly, mounting the planar support surface (precisely) within a housing of an optical device is non-problematic (compared to attempting to mount a prism-shaped within an inverse concavity). Thus, the optical alignment of the prism-shaped reflector is more easily achieved without having adverse effects from expected tolerance mismatches, which results in overall manufacturing costs decreasing through the disclosure provided herein. In other words, manufacturing tolerances for mounting the prism-shaped reflector on the support surface are for forgiving than for other competing techniques used in industry.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1A:
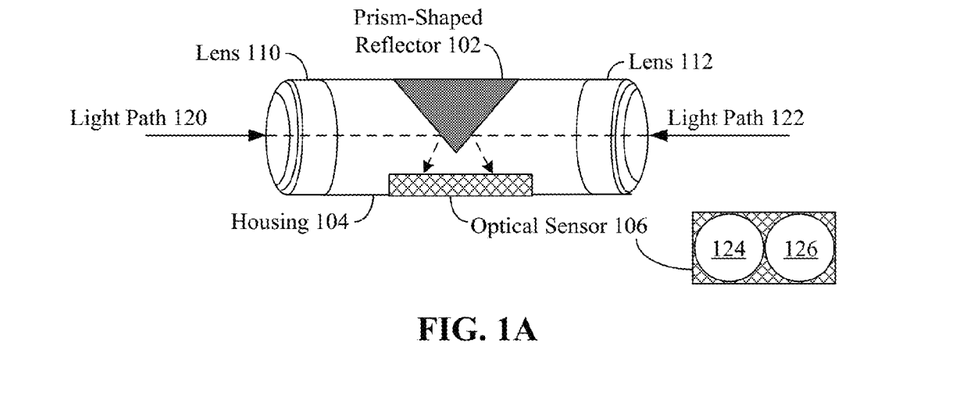
FIG. 1A shows an embodiment of an optical device with two camera lenses facing in substantially opposing directions.

FIG. 1A shows an embodiment of an optical device with two camera lenses 110, 112 facing in substantially opposing directions. Two different light paths 120, 122 exist for optical information to pass through the lenses 110, 112 to reflect off a prism-shaped reflector 102 onto an optical sensor 106. Two different image circles 124, 126, one from each light path 120, 122 are projected onto the optical sensor 106, which converts the optical information into electronic information. The prism-shaped reflector 102 has two different optically reflective surfaces, one for each light path, which direct the light onto the optical sensor 106 to recreate the image circles 124, 126, when the prism-shaped reflector 102 is properly positioned. In embodiments, a single optical sensor 106 is utilized for two different lenses 110, 112. In other embodiments, multiple different optical sensors (one per lens 110, 112) can be utilized with the prism-shaped reflector 102 as defined herein.

Optical alignments for the optical device are extremely precise and tolerances for manufacture and placement of the prism-shaped reflector 102 are essential for its essential functioning. Traditional/conventional methodologies would create an inverse void in the housing within which the prism-shaped reflector 102 is inserted. Slight deviations in a surface of the inverse void (of the prism-shaped enclosed therein) will alter the relatively placement of the prism-shaped reflector. Similarly any slight deviations, extrusions of a prism-shaped reflector will alter the proper alignment if placed into an inverse void. Additionally, the placement and fixing of the prism-shaped device may cause misalignments to occur. In short, manufacturing costs are relatively high (due to the necessary precisions of the tolerances involved) and significant loss of product components (due to being outside the necessary tolerances) result from conventional manufacturing methodologies as confirmed by experiments and prototypes conducted by the disclosure's innovators.

Figure 1B:
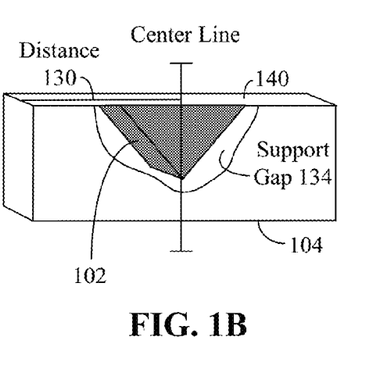
FIG. 1B shows placement of a prism-shaped reflector relative to a housing in accordance with embodiments of the disclosure.
Figure 1C:
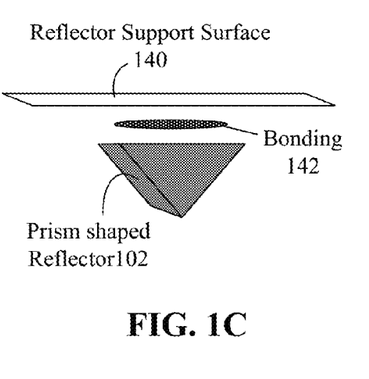
FIG. 1C shows a reflector support surface being bonded to a prism-shaped reflector in accordance with embodiments of the disclosure.

In contrast to the conventional methodologies, embodiments of the disclosure utilize arrangements/techniques shown in FIGS. 1B, and 1C. In embodiments, substantially all (within +/−5 percent) of the support provided for the prism-shaped reflector 102 relative to the housing 104 and optical elements with which it interacts comes from a reflector support surface 140. A support gap 134 exists about the other supportable surfaces of the prism-shaped reflector 102 when positioned within the housing 104. A surface of the prism-shaped reflector 102 is coupled to the reflector support surface 140 by a bonding 142. In embodiments, the reflector support surface 140 can include demarcations for positioning the prism-shaped reflector 102 relative the reflector support surface 140. The reflector support surface 140, once bonded to the prism-shaped reflector 102 is able to be aligned to a surface of the housing 104, such that a distance 130 from a housing 104 edge is aligned so that the prism-shaped reflector 102 is properly positioned. The support gap 134 can be a void, such as an air pocket that permits an amount of shifting of the prism-shaped reflector 102 without touching other components or surfaces of the housing 104.

As used herein, the prism-shaped reflector 120 refers to a unary structure having a support region 206, and reflection regions 202, 204. The support region 206 is a region that bonds (142) to the reflector support surface 140. In one embodiment, the support region 206 can include an entirety of a support plane 216. In other embodiments, such as shown by prism shape 224 of FIG. 2C, the support region can be a portion a raised/depressed region that is a sub-region of the support plane 216. Each reflection region 202, 204 is a reflective region within light path 120, 122 used to reflect light onto the optical sensor 106. Reflection region 202 can be a sub-region of reflection plane 212. Reflection region 204 can be a sub-region of reflection plan 214. In one embodiment, the materials used for reflection region 202 can be the same as the materials for the reflection plane 212, as can those for region 204 and plane 214. In another embodiment, some variation can exist between the materials/angles (relative to the light path 120, 122) for region 202 and plane 212 and for region 204 and plane 214. In another embodiment, reflection region 202 and 204 can be highly polished for optical reasons, while other portions of reflection plane 212 and 214 remain unpolished or less polished.

Figure 2A:
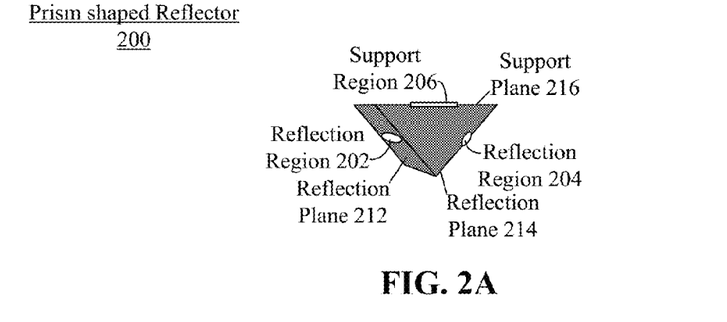
FIG. 2A shows an embodiment of a prism-shaped reflector.

In one embodiment (that for prism-shaped reflector 200), the prism-shaped reflector can be a triangular prism shape, which is a polyhedron with two parallel faces (bases) of triangle shape. The triangle shape of the bases can be an equilateral triangle or an isosceles triangle, such that sides of equal length are those representing an edge of reflection plane 212 and 214. The other faces of the prism are parallelograms. One of these parallelograms is reflection plane 212, one is reflection plane 214, and one is support plane 216. An entire surface of support plane 216 can bond to a planar surface of a reflector support (reflector support surface 140). Reflection plane 212 can be a planar surface, as can reflection plane 214. In one embodiment, each reflection surface (reflection region 202, 204) can be positioned at a forty five degree angle relative to the light path 120, 122 being reflected (where the surfaces 202 and 204 are orthogonal to each other). The forty five degree angle permits a planar surface of an optical sensor 106 to form image circles 124 and 126. The optical characteristics of the prism-shaped reflector 102 and other optical components of the optical device dictate the exact angles of the surfaces 202, 204. That is, rearrangement of the optical lenses 110, 112 and/or the optical sensors 106 will result in corresponding modifications of the prism-shaped reflector 102. The disclosure is intended to encompass in scope all optical derivatives of the models presented herein, which have equivalent effects. For example, the physical shape of the solid used as prism-shaped reflector can deviate from that of the embodiment labeled prism-shaped reflector 200 in any manner such that the optical characteristics are substantially unchanged by these shape deviations. Specifically, the angle and position of reflection region 202 and 204 matter optically (as this is the portion of the reflector that is within the light path 120, 122 to redirect the light), as does the position and shape of support region 206 (as it determines the relative positioning of the prism-shaped reflector within the housing 104; changes to which will alter angles of the reflective regions 202, 204 relative to the light paths 120, 122 such that changes to image circles 124, 126 would result).

Figure 2B:
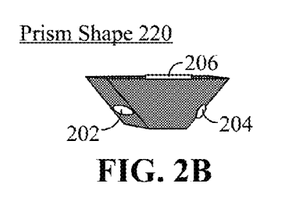
FIG. 2B shows another embodiment of a prism-shaped reflector.

FIG. 2B shows one embodiment where the bases of the prism-shaped reflector are trapezoids. A triangular prism at the apex of the prism-shaped reflector 200 has been removed, which does not affect optical properties as the reflection region 202, reflection region 204, and support region 206 are unchanged over the reflector embodiment of FIG. 2A. The embodiment of FIG. 2B can be beneficial for placing the prism shape 220 within a small form factor housing 104 where space savings is critical/significant.

Figure 2C:
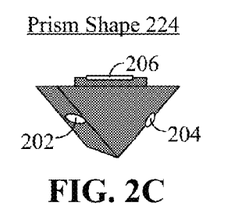
FIG. 2C shows another embodiment of a prism-shaped reflector.

FIG. 2C shows on embodiment where the prism-shaped reflector is a triangular prism but where the support region 206 is vertically extended in an extrusion from the support plane 216. Again, effective optical characteristics of the prism-shaped reflector are substantially unaffected from the embodiment of FIG. 2A. The embodiment of FIG. 2C is beneficial in a situation where a desired height between the reflector support surface 140 and it's vertical support position relative to the housing 104 needs to be extended (so that the light paths 120, 122 relative to the reflection regions 202, 204 are to be adjusted to ensure optical circles 124 and 126 are properly formed given the positioning of optical sensor 106.

Figure 2D:
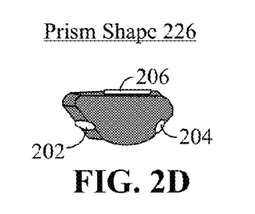
FIG. 2D shows another embodiment of a prism-shaped reflector.

FIG. 2D shows an embodiment where the prism-shaped reflector includes rounded regions, such that the corners of various planes are non-linear. The optical properties for reflection are substantially unchanged from those of the embodiment of FIG. 2A (as relatively placement of support region 206, reflection region 202, and reflection region 204 are substantially equivalent to those of FIG. 2A).

Figure 3:
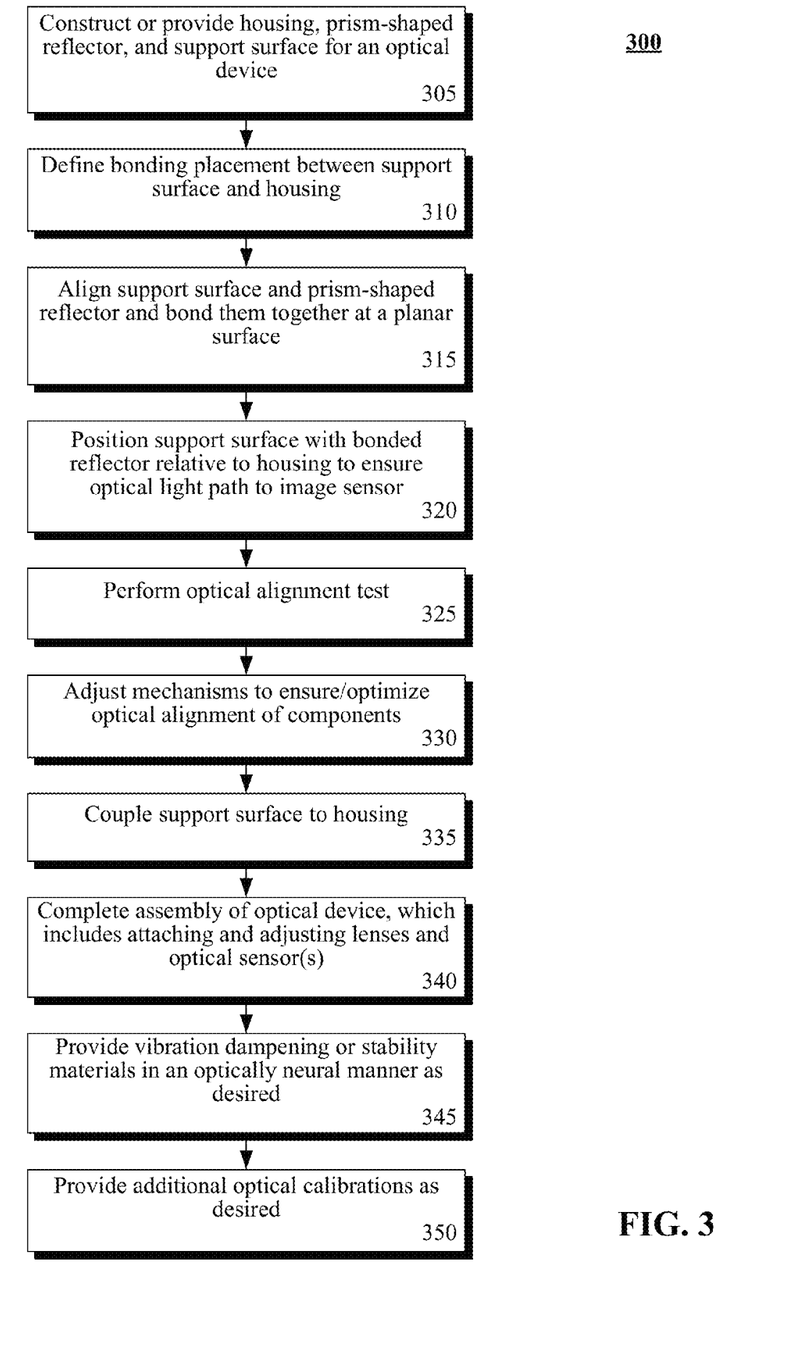
FIG. 3 shows a process for an optical device with two camera lenses facing in substantially opposing directions in accordance with embodiments of the disclosure.

The process through which the prism-shaped reflector (regardless of whether the shape of FIG. 2A-2D or another substantially optical equivalent is used) is emphasized by FIG. 3. The process can begin in step 305, where various components to be assembled for the optical device are constructed or gathered. These components include a housing (e.g., housing 104), a prism-shaped reflector (102), and a reflector support surface (140) for the optical device. A bonding placement for the reflector (102) to be bounded (142) to the support surface (140) can be defined, as shown by step 310. The placement of the reflector (102) relative to the surface (140) can define a length for each edge of the reflector surface 140 to each edge of the prism-shaped reflector. Guidelines or other visual indicia for placement can be marked on the support surface (14) in one embodiment. The defining of the bonding placement can be measured based on the relative position of the reflector support surface 140 to the housing, when the reflector support surface 140 is attached. In one embodiment, an adhesive or bonding surface can be affixed to the support plane 216 and/or the reflector support surface 140. In step 315, after the placement is defined, the reflector support surface and the prism-shaped reflector can be aligned and bonded. The bonding can be along two planar surfaces (one surface being the support surface, the other being the support plane 216).

As indicated by step 320, once bonded to the support surface (to create a fixed component or single unit), this unit can be positioned in the housing. The housing can have a planar surface that matches the planar surface of the unit (to which the reflector is attached). In embodiments, a non-planar surface can be used for the reflector support, so long at the housing (104) and the support surface are able to be coupled together. An outer exterior housing can be optionally placed on the reflector support surface after the support surface is integrated, in one embodiment. In another, the reflector can be coupled to a housing component, which is thereafter coupled within the housing (104). Once the unit (including the bonded reflector and the support surface) are integrated into the housing (104), an optional alignment test can be performed, as shown by step 325. Adjustment mechanisms (such as adjusting a lens (110, 112) position, a position of the optical sensor (106) or a position of the unit containing the reflector (102) can exist, which can be physically adjusted at this state to optimize the optical alignment per the test, as shown in step 330. In step 335, the reflector support surface can be coupled to the housing surface. In step 340, the assembly of the optical device can be completed. This completion can include positioning lenses (110, 112), power units, and other components. The order for assembling components can vary from embodiment to embodiment and the disclosure is not to be constructed as limited in scope to the specific ordering of component assembly steps detailed herein. During his assembly process, as shown by step 345, vibration dampening measures can be taken, such as filling the support gap 134 with optically neutral substances (substances that do not adversely affect the light path 120-122 reflections to the optical sensor 106) to further seal components of the optical device. For example, a gel with a low index of refraction and a high transparency can be included in the support gap 134 in one embodiment. In step 350, software/firmware adjustments can be made to correct any slight optical misalignments able to be handled through digital signal processing of the electronic signal that result from the optical information striking the image circles 124, 126. Other optical calibrations can be made in this step as well.

Figure 2E:
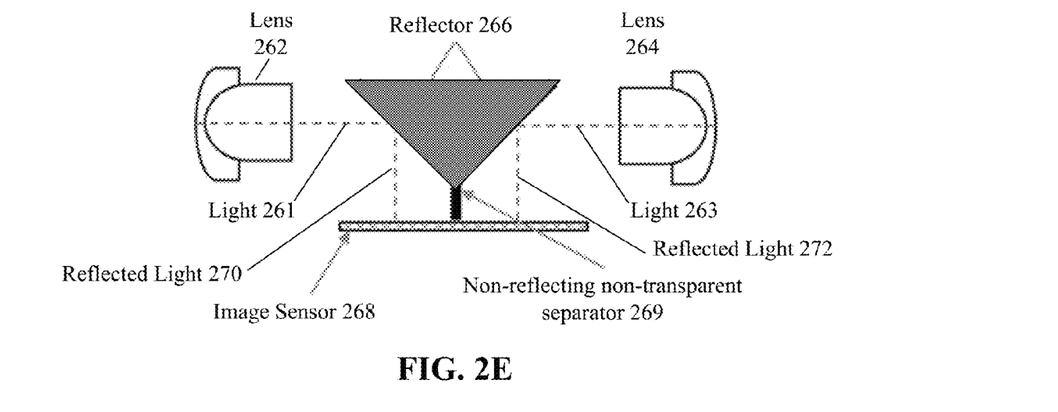
FIG. 2E shows an optical arrangement of components in accordance with embodiments of the disclosure.

FIG. 2E shows the optical arrangements of the prism-shaped reflector 266, lenses 262, 264, and image sensor 268 in embodiments of the disclosure. The housing size/shape can differ from embodiment to embodiment in accordance with the descriptions detailed herein without significantly affecting the effective optical properties (using a prism-shaped reflector 266 to reflect light from two opposing lenses 262, 264 onto an image sensor 268). As shown, a non-reflecting non-transparent separator 269 can be used for isolating opposing lenses from each other for an assembly that produces concurrent non-overlapping image circles on a common image sensor in accordance with an embodiment of the inventive arrangements disclosed herein.

The embodiment of FIG. 2E can utilize a lens arrangement with opposing lenses 262, 264, each directing their captured optics to a prism-shaped reflector (e.g., reflector 266). The prism-shaped reflector 266 can establish an angle to direct light to the image sensor 268. In one embodiment, the angle of reflector off each reflector surface can be 45 degrees (+/−5 degrees). In another embodiment, a sixty degree angle (+/−5 degrees) can exist. Other angles can be accommodated for (such as reflecting light 261, 263 upwards or downwards relative to horizontal plane and making corresponding adjustments to the angle of the reflector's surface and/or the placement of the image sensor 268. In FIG. 2E, the reflected light 270, 272 is isolated (from the reflector onward by a non-reflective non-transparent separator 269 (e.g., a blinder to ensure optical interfere between image circles is minimized).

As shown, the arrangement of FIG. 2E can permit the overall reflector position, separator element, and image sensor to be fixed for a variety of lenses. The lenses can be repositioned along their optical center to be closer or further away from the reflector (depending on optical characteristics). It should be appreciated that separator 269 shape, thickness, attenuation coefficient can vary between embodiments, permitting the function of the separator to operate within acceptable tolerances.

One key consideration for the embodiments of the disclosure is that optical parameters of the image circle are not changed after being reflected by the reflector. That is, that the prism-shaped reflector can be placed at any distance from the image where the total distance from the lens to the image sensor remains the same, even though significant adjustments are possible for form-factor/design purposes. For example, the focal length of lenses 262, 264 can be arbitrarily divided into two segments of varying length whose sum can be approximately equal to the focal length of the lenses 262, 264.

Figure 4A:
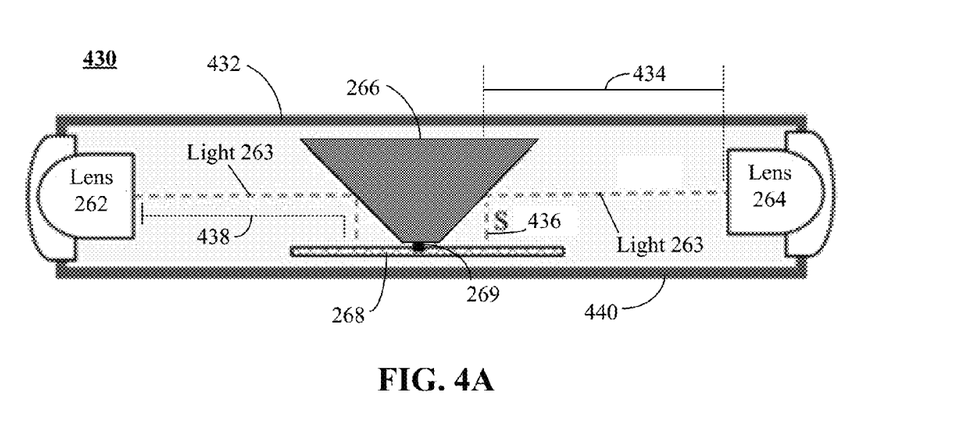
FIG. 4A shows an embodiment of an optical device.
Figure 4B:
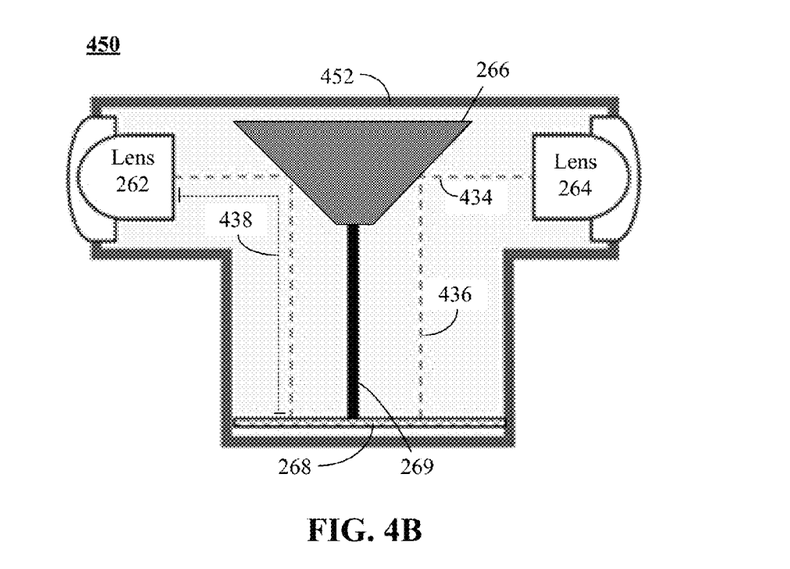
FIG. 4B shows another embodiment of an optical device.
Figure 4C:
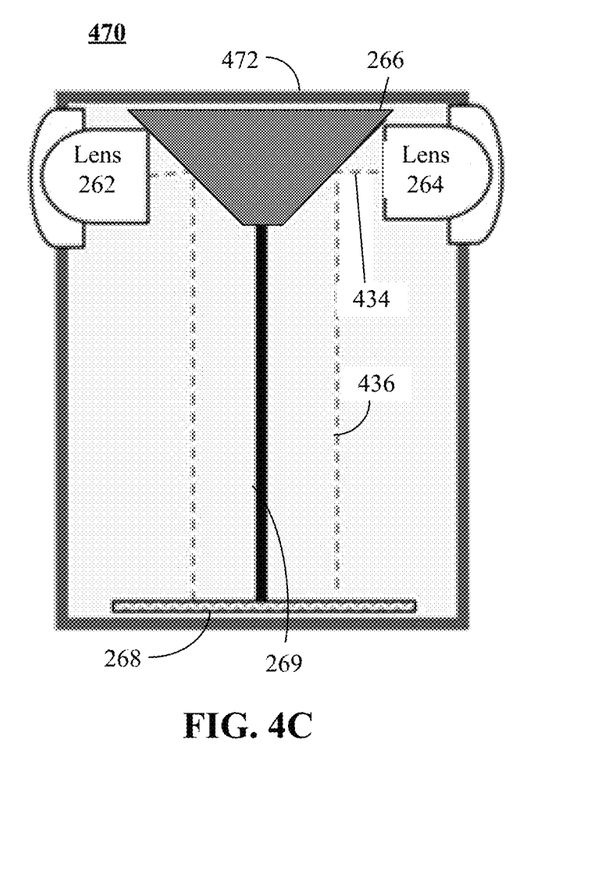
FIG. 4C shows another embodiment of an optical device.

Embodiments 430, 450, 470 illustrate three different such arrangements as shown in FIGS. 4A, 4B, and 4c. In these embodiments 430, 450, 470, the optical properties (e.g., length from lens (262, 264) to image sensor 268) are stable and effectively unchanged. Thus, many different physical arrangements are possible, yet the functional (e.g., electronic features/optical functions) are stable/unchanged. In other words, the image circle striking the image sensor is substantially the same regardless of which of the above physical arrangements are used. In these embodiments, for simplicity of expression, a reflector support surface 140 bonded (142) to the prism-shaped reflector (102, 266) is not explicitly shown, but its use and placement is evident to one of ordinary skill in context based on the disclosure.

In embodiment 430, lenses 262, 264 can be arranged along a horizontal or vertical plane to maximize the distance 434 between lens 262, 264 and reflector (266) surfaces and minimize the distance 436, 438 between the reflector surfaces and image sensor 268. For example, the housing 432 of a multi-lens camera of embodiment 430 can be a horizontal cylindrical tube with lens 262, 264 at each end and image sensor 268 in the middle. In the embodiment, separator 269 can be placed between reflectors 216 to block light emanating from the edges of image circles on sensor 218. When the prism-shaped reflector 266 is significantly close to the image sensor 268 (as illustrated), use of a separator 269 is not essential (since light scattering between the image circles is less problematic in such instances).

FIGS. 4B and 4C illustrate a set of embodiments 450, 470 for isolating opposing lenses from each other for an assembly that produces concurrent non-overlapping image circles on a common image sensor in accordance with an embodiment of the inventive arrangements disclosed herein. In embodiment 450, lenses 262, 264 and sensor 268 can be arranged in a within a three way junction shaped housing 452. In the embodiment 450, distance 434, 436 can be approximately equivalent. For example, the housing 452 of a multi-lens camera of embodiment 450 can be a vertical "T" shape with lens 262, 264 at the branch ends and image sensor 268 at the base. That is, lens 264, 266 and sensor 268 can be equidistant from reflector's surface. In the embodiment, separator 269 can be placed between reflector surfaces to block light emanating from the edges of image circles on sensor 268.

In embodiment 470, lenses 262, 264 and sensor 268 can be arranged in a within a vertical rectangular solid shaped housing 472. In the embodiment 470, distance 436 can be approximately substantially larger than distance 434. For example, the housing 472 of a multi-lens camera of embodiment 470 can be a rectangular shape with lens 262, 264 at the top and image sensor 268 at the base. That is, lens 262, 264 can be proximate (e.g., distance 434) to reflector surface and sensor 268 can the remaining distance of the focal length from reflector surface. In the embodiment, separator 269 can be placed between reflector surfaces to block light emanating from the edges of image circles on sensor 268. The embodiments 430, 450, 470 are illustrative where other arrangements are contemplated to achieve the same net result.

Figure 5:
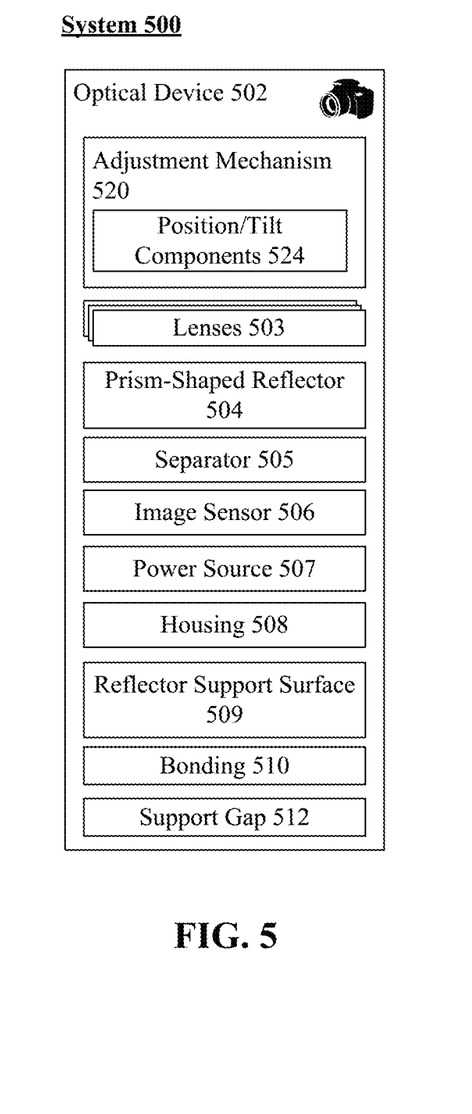
FIG. 5 shows a system for an optical device in accordance with embodiments of the disclosure.

FIG. 5 shows an optical system 500 having components detailed in other embodiments of the disclosure. For example, lenses 503 correspond to lenses 262, 264, 110, 112; prism-shaped reflector 504 to reflector 102, 200, 220, 224, 226, 266; separator 505 to separator 269; image sensor 506 to sensor 106, 268; housing 508 to housing 104, 232, 252, 272; reflector support surface 509 to surface 140; bonding 510 to bonding 142; support gap 512 to gap 134, respectively. Using FIG. 5 and system 500 specifics of components from the various embodiments are elaborated upon for clarity.

In system 500, an optical device 502 can include an adjustment mechanism 520 which can facilitate various lens-reflector-sensor arrangements for the disclosure. In one instance, optical capture device 502 can be a 360 degree camera with two or more lenses (e.g., fish eye, wide angle, ultra wide angle). In the instance, lens 503 can move within a panoramic arc to capture a panoramic view of a real world environment. System 500 can include, but is not limited to, an adjustment mechanism 520, lenses 503, prism-shaped reflector 504, a separator 505, an image sensor 506, power source 507, a housing 508, a reflector support surface 509, a bonding 510, a support gap 512, a data store, a transceiver, and the like. Device 502 can include characteristics such as aperture, focal length, depth of field, and the like. In one embodiment, device 501 can include a set of a fixed surround imaging components for capturing a field of view of between two hundred and seventy to three hundred and sixty degrees of a horizontal plane. For example, device 502 can include two diametrically opposing wide angle or ultra-wide angle lenses able to capture a field of view (FOV) of greater than 180 degrees. It should be appreciated that device 502 can include, but is not limited to, a pan capability, a tilt functionality, a zoom capability, and the like, as indicated by components 524. In one embodiment, device 502 can include wired capabilities, wireless functionality, and the like.

In one instance, device 502 can include, but is not limited to, thermal imaging, infrared capabilities, low light functionality, and the like. In one embodiment, device 502 can include an array of lenses able to capture a high definition view of a real world environment. It should be appreciated that device 502 resolution can meet or exceed Standard Definition (SD), High Definition (HD), Quad HD/4K (QHD), and the like.

Adjustment mechanism 520, present in embodiments, can be a hardware/software entity for controlling position/tilt components 524. Mechanism 520 can include, but is not limited to, position/tilt components 524, settings, control logic (e.g., software/firmware), and the like. Position/tilt components 524 can include electromechanical components, electromagnetic components, and the like. For example, components 364 can include actuator motors, an accelerometer, and control logic which can dynamically adjust lenses 503, reflector 504, and/or image sensor 506 responsive to a user command. In one instance, adjustment mechanism 520 can respond to camera operations including, but not limited to, pan, zoom, tilt, and the like. In one embodiment, mechanism 520 can include a gyroscopically stabilized framework which can be automatically triggered responsive to a manual camera position change. For example, when a user tilts the camera downwards, the lenses can move upward and the reflectors and sensor can be correspondingly adjusted. It should be appreciated that mechanism 520 can allow for arbitrary lens 503 placement which can permit assembly (e.g., housing 508) and consequently geometry of optical to be arbitrary. Contemplated embodiments include regular and irregular shapes including, but not limited to, spherical shapes, pyramidal shapes, hexagonal prism, octahedral shapes, cylindrical shapes, cuboidal shapes, dodecahedral shapes, and the like.

Lenses 503 can be a transmissive optical device that affects the focus of a light beam through refraction. Lenses 503 can include simple lenses, compound lenses, a lens array (e.g., lens stack), and the like. Lenses 353 can include, but is not limited to, biconvex, planoconvex, planoconcave, biconcave, positive meniscus, negative meniscus, and the like.

Prism-shaped reflector 504 can include two or more light reflective surfaces for transmitting light from lens 504 to image sensor 506. In one embodiment, each of the reflective surfaces of reflector 504 can be a plane mirror. Reflective surfaces can include, but are not limited to silver glass mirrors, dielectric coated mirror, and the like. In one instance, reflector surface geometry can conform to approximately half of the image sensor size to permit correspondingly sized image circles to be formed on the rectangular (or square) image sensor.

Separator 505 can be a physical element for absorbing light within device 502. Separator 505 geometry can include, but is not limited to, a rectangle, a square, a trapezoid, and the like. It should be appreciated that separator 505 size (e.g., width, height, thickness) can conform to any arbitrary dimension. In one instance, separator 505 width can conform to the image sensor 506 width and height can be approximately equivalent to the sensor-reflector distance. In one embodiment, separator 505 can be made of specialized materials such as VANTABLACK (e.g., "super" black material) with extremely high light absorption capabilities. In another embodiment, separator 505 can be covered in a light absorbing coating (e.g., light absorbing paint, light absorbing textures).

Image sensor 506 can be a hardware/software element for converting an optical image into an electronic signal. Sensor 506 semiconductor charge-coupled devices (CCD), active pixel sensors in complementary metal-oxide-semiconductor (CMOS), N-type metal-oxide-semiconductor (NMOS, Live MOS) technologies, and the like. Sensor size and/or resolution can conform to traditional and/or proprietary form factors and/or resolutions. For example, sensor 506 can be a 1/3.2" rectangular sensor with a height of 4.54 millimeters and a width of 3.39 millimeters.

Power source 507 can be a hardware/software electrical and/or electro-chemical entity able to provide electricity to device 502, device 502 components, adjustment mechanism 520, position/tilt components 524, and the like. Power source 507 can include, but is not limited to, a battery, an electrical power source, and the like.

The housing 508 can be enclose and protect sensitive device components from environmental factors. The housing 508 provides support to ensure that the components of device 502 are optically spaced to ensure light from lenses 503 reflects off surfaces of reflector 504 onto the image sensor 506 as detailed herein, such as shown by FIG. 2E. The housing can be made of various materials including, but not limited to, plastics, rubber, metal, and the like. Housing can include a reflector surface support 509 with a bonding 510 joining it to the prism-shaped reflector 504, such as shown by FIG. 1C. The surface support 509 with bonded reflector 504 positions the prism-shaped reflector 504 with respect to other housing 508 components. In one embodiment, a support gap 512 exists about the prism-shaped reflector such that greater than 90 percent (up to 100 percent) of the support holding the reflector 504 in relative position to the housing 508 is from the reflector support surface 509.

The reflector support surface 504 in one embodiment includes a plane that corresponds to a plane of the prism-shaped reflector, such that the two are bonded at these respective planes. Other geometries, such as corresponding curves facilitating adhesion or joining (i.e., the surface 509 can be concave and the joined side of the reflector can be a matching convex curve) are contemplated and are to be considered within scope of the disclosure. The reflector support surface 509 can be mounted the housing 508 and secured in place using screws, rivets, bolts, welds, adhesive, and other fasteners in various contemplated embodiments. An outer surface of the reflector support surface 509 is exposed as an outer surface of the housing 508 in one embodiment. In other embodiments, surface 509 is enclosed entirely within an interior of the housing 508 (when the device 502 is assembled).

Bonding 510 refers to a substance applied to the surfaces of surface 509 and reflector 504 that binds these materials together and resists separation once bound. The bonding 510 may utilize thermal bonding, chemical bonding, or mechanical bonding processes. Different bonding processes may be used for binding surface 509 than is used for binding reflector 504 in one embodiment, although the same binding material and process may be used in other embodiments. Bonding 510 in one embodiment may include a drying adhesive, such as glue, contact adhesives, rubber cements, and polymer dispersion adhesives (polyvinyl acetate (PVAc) based ones, for example). Bonding 510 in one embodiment by utilize pressure-sensitive adhesives (PSA), such as acrylate based polymers. Bonding 510 in embodiments can be a hot adhesive that are thermoplastics applied in molten form which solidify on cooling to form strong bonds between materials. Bonding 510 may also utilize a multi-part adhesive, such as a polymer that cross-links via a chemical reaction. Bonding 510 in embodiments can be a one-part adhesive that hardens via a chemical reaction with an external energy source, such as radiation, heat, and moisture.

The support gap 512 represents a space having no or minimal support within a volume of the housing 508 within which the prism-shaped reflector 504 is inserted. Because of this support gap 512, placement (physical and optical) of the prism-shaped reflector 504 relative to the lenses 503 and the image sensor 506 is based on the support and positioning provided by the reflector support surface 509 as it is positioned within the housing 508.

The flowchart and block diagrams in the FIGS. 1-5 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:
1. An optical device comprising:
a housing;
two lenses coupled to the housing in substantially opposing directions;
a triangular prism-shaped reflector having two parallel surfaces and three additional surfaces comprising: a first and a second reflective surfaces and a support plane;
a reflector support surface bonded to the triangular prism-shaped reflector at the support plane;
a support gap comprising a volumetric support void between the triangle shaped prism and interior components excluding the ninety five percent or more support for maintaining a relative position of the triangular prism-shaped reflector to other components of the optical device results from the reflector support surface being bonded to the triangular prism-shaped reflector support surface as well as an interior surface of the housing, wherein; and
one or more optical sensors upon which two non-overlapping image circles are concurrently projected, one from each of the two lenses, wherein each image circle results from a light path from a respective one of the two lenses being reflected off one of the first and second reflective surfaces onto a surface of the one or more optical sensors.

2. The optical device of claim 1, wherein the triangular prism-shaped reflector is bonded to the reflector support surface before the reflector support surface is secured within the housing.

3. The optical device of claim 1, wherein the one or more optical sensors is one optical sensor.

4. The optical device of claim 3, further comprising:
a non-reflecting, non-transparent separator positioned within the housing between light paths from the two lenses after these light paths are reflected by the first and second reflective surfaces.

5. The optical device of claim 1, wherein each of the two lenses is an ultra-wide angle lens having a field of view of greater than 180 degrees.

6. The optical device of claim 1, wherein a surface of the optical sensor and a light path between each of the two lenses and respective reflective surfaces of the triangular prism-shaped reflector are within five degrees of being parallel.

7. The optical device of claim 1, wherein a length of each of the first and second reflective surfaces is equal.

8. The optical device of claim 1, wherein a ninety degree angle exists between the first and second reflective surfaces, wherein a forty-five degree angle exists between each of the first and second reflective surfaces and a planar surface of the one or more optical sensors.

9. A camera comprising:
a housing;
two ultra-wide camera lenses, each having a field of view of greater than 180 degrees, coupled to the housing in substantially opposing directions;
a prism-shaped reflector having two parallel surfaces and three additional surfaces comprising: a first and a second reflective surfaces and a support plane;
a reflector support surface bonded to the prism-shaped reflector at the support plane; and
an optical sensor upon which two non-overlapping image circles are concurrently projected, one from each of the two lenses, wherein each image circle results from a light path from a respective one of the two lenses being reflected off one of the first and second reflective surfaces onto a surface of the optical sensor.

10. The camera of claim 9, wherein the prism-shaped reflector is a triangular prism-shaped reflector.

11. The camera of claim 9, wherein ninety five percent or more support for maintaining a relative position of the triangular prism-shaped reflector to other components of the optical device results from the reflector support surface being bonded to the prism-shaped reflector.

12. The camera of claim 9, wherein a support plane of the reflector support surface does not intersect a light path between the two ulta-wide camera lenses and the optical sensor.

13. The camera of claim 9, wherein a surface of the optical sensor and a light path between each of the two lenses and respective reflective surfaces of the triangular prism-shaped reflector are within five degrees of being parallel.

14. The camera of claim 9, wherein a length of each of the first and second reflective surfaces is equal.

15. The camera of claim 9, wherein a ninety degree angle exists between the first and second reflective surfaces, wherein a forty-five degree angle exists between each of the first and second reflective surfaces and a planar surface of the optical sensor.

16. A camera comprising:
a housing;
two ultra-wide camera lenses, each having a field of view of greater than 180 degrees, coupled to the housing in substantially opposing directions;
a prism-shaped reflector having a first reflection region on a first reflection plane, a second reflection region on a second reflection plane, and a support region on a support plane, wherein the first reflection region, the second reflection region, and the support region are planar surfaces, wherein an angle of eight five to ninety five degrees exists between the first reflection region and the second reflection region, wherein an angle of forty to fifty degrees exists between the support region and each of the first and second reflection regions;
a reflector support surface bonded to the prism-shaped reflector at the support region; and
an optical sensor upon which two non-overlapping image circles are concurrently projected, one from each of the two lenses, wherein each image circle results from a light path from a respective one of the two lenses being reflected off one of the first and second reflection regions onto a surface of the optical sensor.

17. The camera of claim 16, wherein the prism-shaped reflector is a triangular prism-shaped reflector.

18. The camera of claim 16, wherein ninety five percent or more support for maintaining a relative position of the prism-shaped reflector to other components of the camera results from the reflector support surface being bonded to the triangular prism-shaped reflector.

19. The camera of claim 16, wherein a support plane of the reflector support surface does not intersect a light path between the two ulta-wide camera lenses and the optical sensor.

20. The camera of claim 16, wherein a surface of the optical sensor and a light path between each of the two lenses and respective reflective surfaces of the triangular prism-shaped reflector are within five degrees of being parallel.

* * * * *